(12) United States Patent
Pryor

(10) Patent No.: US 8,723,801 B2
(45) Date of Patent: *May 13, 2014

(54) MORE USEFUL MAN MACHINE INTERFACES AND APPLICATIONS

(71) Applicant: Gesture Technology Partners, LLC, Sylvania, OH (US)

(72) Inventor: Timothy R. Pryor, Sylvania, OH (US)

(73) Assignee: Gesture Technology Partners, LLC, Sylvania, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,577

(22) Filed: Mar. 26, 2013

(65) Prior Publication Data

US 2013/0222252 A1 Aug. 29, 2013

Related U.S. Application Data

(63) Continuation of application No. 13/714,748, filed on Dec. 14, 2012, now Pat. No. 8,553,079, which is a continuation of application No. 12/700,055, filed on Feb. 4, 2010, which is a continuation of application No. 10/866,191, filed on Jun. 14, 2004, now abandoned, which is a continuation of application No. 09/433,297, filed on Nov. 3, 1999, now Pat. No. 6,750,848.

(60) Provisional application No. 60/107,652, filed on Nov. 9, 1998.

(51) Int. Cl.
*G06F 3/02* (2006.01)

(52) U.S. Cl.
USPC ........... 345/168; 345/158; 345/157; 345/156; 340/407.2; 341/22; 400/719

(58) Field of Classification Search
CPC .............. G06F 3/02; G06F 3/041; G06F 3/04
USPC ............. 345/168, 157, 156, 173, 7, 435, 700; 340/407.2; 341/22; 400/719
See application file for complete search history.

(56) References Cited

U.S. PATENT DOCUMENTS

| | | |
|---|---|---|
| 3,909,002 A | 9/1975 | Levy |
| 4,219,847 A | 8/1980 | Pinkney et al. |
| 4,339,798 A | 7/1982 | Hedges et al. |
| 4,631,676 A | 12/1986 | Pugh |
| 4,791,589 A | 12/1988 | Blazo et al. |
| 4,843,568 A | 6/1989 | Krueger et al. |
| 4,908,704 A | 3/1990 | Fujioka et al. |
| 4,988,981 A * | 1/1991 | Zimmerman et al. ........ 345/158 |
| 5,008,946 A | 4/1991 | Ando |
| 5,088,928 A | 2/1992 | Chan |
| 5,227,986 A | 7/1993 | Yokota et al. |

(Continued)

*Primary Examiner* — Olga Merkoulova
(74) *Attorney, Agent, or Firm* — Warner Norcross & Judd LLP

(57) ABSTRACT

A method for enhancing a well-being of a small child or baby utilizes at least one TV camera positioned to observe one or more points on the child or an object associated with the child. Signals from the TV camera are outputted to a computer, which analyzes the output signals to determine a position or movement of the child or child associated object. The determined position or movement is then compared to preprogrammed criteria in the computer to determine a correlation or importance, and thereby to provide data to the child.

30 Claims, 7 Drawing Sheets

(56) References Cited

U.S. PATENT DOCUMENTS

| | | |
|---|---|---|
| 5,249,053 A | 9/1993 | Jain |
| 5,297,061 A | 3/1994 | Dementhon et al. |
| 5,365,597 A | 11/1994 | Holeva |
| 5,376,796 A | 12/1994 | Chan et al. |
| 5,388,059 A | 2/1995 | DeMenthon |
| 5,454,043 A | 9/1995 | Freeman |
| 5,491,507 A | 2/1996 | Umezawa et al. |
| 5,534,921 A | 7/1996 | Sawanobori |
| 5,572,251 A | 11/1996 | Ogawa |
| 5,581,276 A | 12/1996 | Cipolla et al. |
| 5,594,469 A | 1/1997 | Freeman et al. |
| 5,616,078 A | 4/1997 | Oh |
| 5,624,117 A | 4/1997 | Ohkubo et al. |
| 5,781,647 A | 7/1998 | Fishbine et al. |
| 5,781,650 A | 7/1998 | Lobo et al. |
| 5,821,922 A * | 10/1998 | Sellers ............ 345/157 |
| 5,828,770 A | 10/1998 | Leis et al. |
| 5,845,006 A | 12/1998 | Sumi et al. |
| 5,853,327 A | 12/1998 | Gilboa |
| 5,878,174 A | 3/1999 | Stewart et al. |
| 5,904,484 A | 5/1999 | Burns |
| 5,926,168 A | 7/1999 | Fan |
| 5,936,610 A * | 8/1999 | Endo ............ 345/157 |
| 5,940,126 A | 8/1999 | Kimura |
| 5,982,352 A | 11/1999 | Pryor |
| 5,999,840 A | 12/1999 | Grimson et al. |
| 6,052,132 A | 4/2000 | Christian et al. |
| 6,098,458 A | 8/2000 | French et al. |
| 6,108,033 A | 8/2000 | Ito et al. |
| 6,148,100 A | 11/2000 | Anderson et al. |
| 6,160,899 A | 12/2000 | Lee et al. |
| 6,204,852 B1 | 3/2001 | Kumar et al. |
| 6,252,598 B1 | 6/2001 | Segen |
| 6,342,917 B1 | 1/2002 | Amenta |
| 6,346,929 B1 | 2/2002 | Fukushima et al. |
| 6,359,647 B1 | 3/2002 | Sengupta et al. |
| 6,363,160 B1 | 3/2002 | Bradski et al. |
| 6,373,472 B1 | 4/2002 | Palalau et al. |
| 6,442,465 B2 | 8/2002 | Breed et al. |
| 6,508,709 B1 | 1/2003 | Karmarkar |
| 6,529,617 B1 | 3/2003 | Prokoski |
| 6,597,817 B1 | 7/2003 | Silverbrook |
| 6,663,491 B2 | 12/2003 | Watabe et al. |
| 6,690,357 B1 * | 2/2004 | Dunton et al. ............ 345/158 |
| 6,750,848 B1 * | 6/2004 | Pryor ............ 345/168 |
| 6,775,361 B1 | 8/2004 | Arai et al. |
| 6,788,336 B1 | 9/2004 | Silverbrook |
| 6,911,972 B2 | 6/2005 | Brinjes |
| 7,489,863 B2 | 2/2009 | Lee |

* cited by examiner

MORE USEFUL MAN MACHINE INTERFACES AND APPLICATIONS

BACKGROUND OF THE INVENTION

Field of the Invention

The invention relates to simple input devices for computers, particularly, but not necessarily, intended for use with 3-D graphically intensive activities, and operating by optically sensing object or human positions and/or orientations. The invention in many preferred embodiments, uses real time stereo photogrammetry using single or multiple TV cameras whose output is analyzed and used as input to a personal computer, typically to gather data concerning the 3D location of parts of, or objects held by, a person or persons.

This continuation application seeks to provide further detail on useful embodiments for computing. One embodiment is a keyboard for a laptop computer (or stand-alone keyboard for any computer) that incorporates digital TV cameras to look at points on, typically, the hand or the finger, or objects held in the hand of the user, which are used to input data to the computer. It may also or alternatively, look at the head of the user as well.

Both hands or multiple fingers of each hand, or an object in one hand and fingers of the other can be simultaneously observed, as can alternate arrangements as desired.

BRIEF DESCRIPTION OF FIGURES

FIG. 4 illustrates learning, amusement, monitoring, and diagnostic methods and devices for the crib, playpen and the like.

DESCRIPTION OF THE INVENTION

FIG. 1

Figure 1:
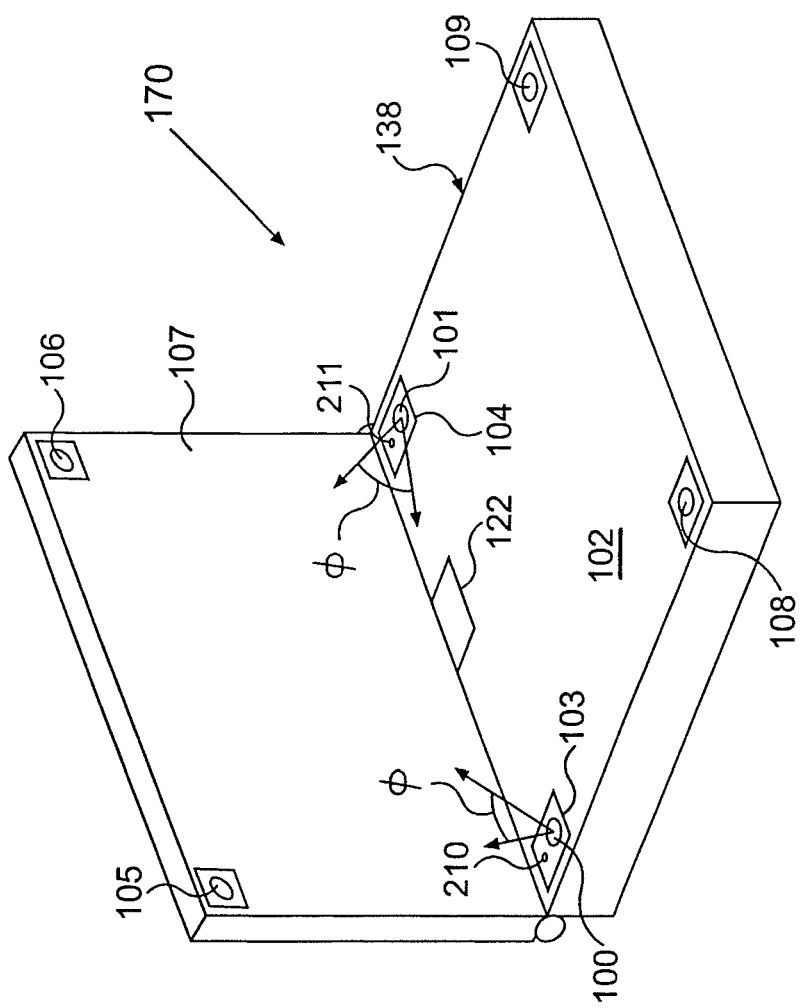
FIG. 1 illustrates a laptop or other computer keyboard with cameras according to the invention located on the keyboard surface to observe objects such as fingers and hands overhead of the keyboard.

A laptop (or other) computer keyboard based embodiment is shown in FIG. 1. In this case, a stereo pair of cameras 100 and 101 located on each side of the keyboard are used, desirably having cover windows 103 and 104 mounted flush with the keyboard surface 102. The cameras are preferably pointed obliquely inward at angles Φ toward the center of the desired work volume 170 above the keyboard. In the case of cameras mounted at the rear of the keyboard (toward the display screen), these cameras are also inclined to point toward the user at an angle as well.

Alternate camera locations may be used such as the positions of cameras 105 and 106, on upper corners of screen housing 107 looking down at the top of the fingers (or hands, or objects in hand or in front of the cameras), or of cameras 108 and 109 shown.

One of the referenced embodiments of the invention is to determine the pointing direction vector 160 of the user's finger (for example pointing at an object displayed on screen 107), or the position and orientation of an object held by the user. Alternatively, finger position data can be used to determine gestures such as pinch or grip, and other examples of relative juxtaposition of objects with respect to each other, as has been described in co-pending referenced applications. Positioning of an object or portions (such as hands or fingers of a doll) is also of use, though more for use with larger keyboards and displays.

Figure 2:
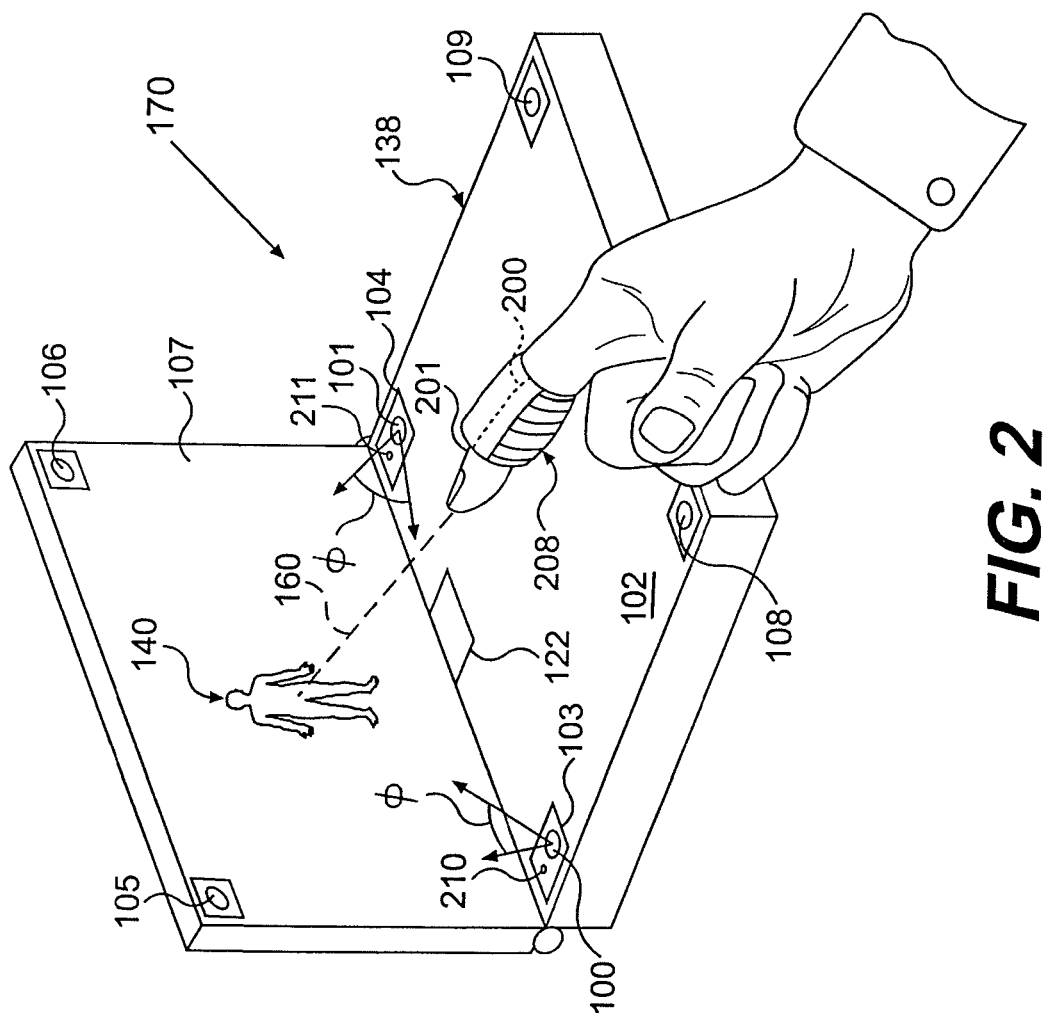
FIG. 2 illustrates another keyboard embodiment using special datums or light sources such as LEDs.

In one embodiment, shown in FIG. 2, cameras such as 100/101 are used to simply look at the tip of a finger 201 (or thumb) of the user, or an object such as a ring 208 on the finger. Light from below, such as provided by single central light 122 can be used to illuminate the finger that typically looks bright under such illumination.

It is also noted that the illumination is directed or concentrated in an area where the finger is typically located such as in work volume 170. If the light is of sufficient spectral content, the natural flesh tone of the finger can be observed— and recognized by use of the color TV cameras 100/101.

As is typically the case, the region of the overlapping cameras viewing area is relatively isolated to the overlapping volumetric zone of their fields 170 shown due to focal lengths of their lenses and the angulation of the camera axes with respect to each other. This restricted overlap zone helps mitigate against unwanted matches in the two images due to information generated outside the zone of overlap. Thus there are no significant image matches found of other objects in the room, since the only flesh-toned object in the zone is typically the finger or fingers of the user. Or alternatively, for example, the user's hand or hands. Similarly objects or targets thereon can be distinguished by special colors or shapes.

If desired, or required, motion of the fingers can be also used to further distinguish their presence vis-a-vis any static background. If for example, by subtraction of successive camera frames, the image of a particular object is determined to have moved it is determined that this is likely the object of potential interest which can be further analyzed directly to determine if is the object of interest.

In case of obscuration of the fingers or objects in the hand, cameras in additional locations such as those mentioned above, can be used to solve for position if the view of one or more cameras is obscured.

The use of cameras mounted on both the screen and the keyboard allows one to deal with obscurations that may occur and certain objects may or may not be advantageously delineated in one view or the other.

In addition, it may be in many cases desirable to have a datum on the top of the finger as opposed to the bottom because on the bottom, it can get in the way of certain activities. In this case the sensors are required on the screen looking downward or in some other location such as off the computer entirely and located overhead has been noted in previous application.

To determine finger location, a front end processor like that described in the target holes and corners co-pending application reference incorporated U.S. Ser. Nos. 08/203,603 and 08/468,358 can be used to also allow the finger shape as well as color to be detected.

Finger gestures comprising a sequence of finger movements can also be detected by analyzing sequential image sets such as the motion of the finger, or one finger with respect to another such as in pinching something can be determined. Cameras 100 and 101 have been shown at the rear of the keyboard near the screen or at the front. They may mount in the middle of the keyboard or any other advantageous location.

The cameras can also see one's fingers directly, to allow typing as now, but without the physical keys. One can type in space above the plane of the keyboard (or in this case plane of the cameras). This is useful for those applications where the keyboard of conventional style is too big (e.g., the hand held computer of FIG. 6).

FIG. 2

It is also desirable for fast reliable operation to use retroreflective materials and other materials to augment the contrast of objects used in the application. For example, a line target such as 200 can be worn on a finger 201, and advantageously can be located if desired between two joints of the finger as shown. This allows the tip of the finger to be used to type on the keyboard without feeling unusual—the case perhaps with target material on tip of the finger.

The line image detected by the camera can be provided also by a cylinder such as retroreflective cylinder 208 worn on the finger 201 which effectively becomes a line image in the field of view of each camera (assuming each camera is equipped with a sufficiently coaxial light source, typically one or more LEDs such as 210 and 211), can be used to solve easily using the line image pairs with the stereo cameras for the pointing direction of the finger that is often a desired result. The line, in the stereo pair of images provides the pointing direction of the finger, for example pointing at an object displayed on the screen 140 of the laptop computer 138.

FIG. 3

Figure 3:
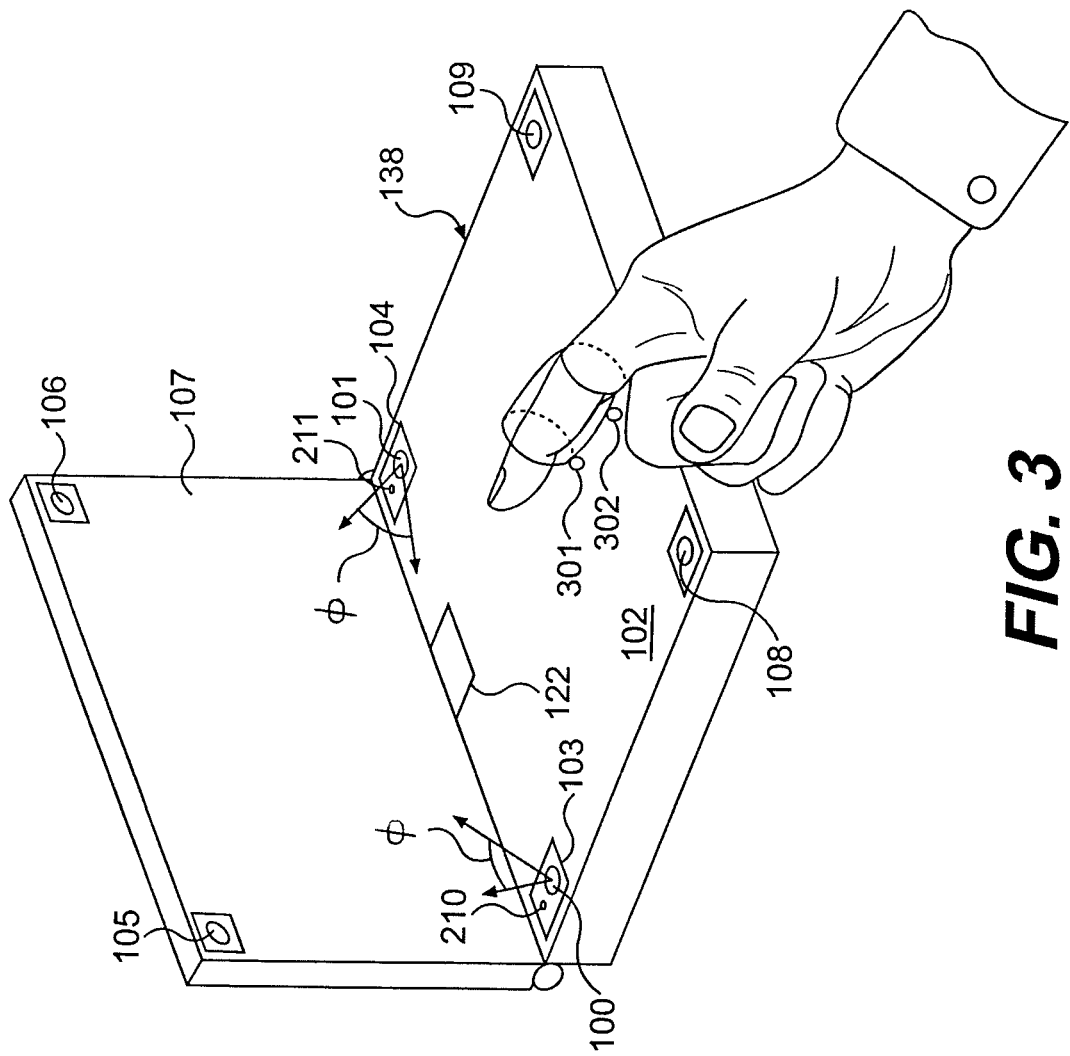
FIG. 3 illustrates a further finger detection system for laptop or other computer input.

It is also possible to have light sources on the finger that can be utilized such as the 2 LED light sources shown in FIG. 3. This can be used with either TV camera type sensors or with PSD type analog image position sensors as disclosed in references incorporated.

In particular the ring mounted LED light sources 301 and 302 can be modulated at different frequencies that can be individually discerned by sensors imaging the sources on to a respective PSD detector. Alternatively, the sources can simply be turned on and off at different times such that the position of each point can be independently found allowing the pointing direction to be calculated from the LED point data gathered by the stereo pair of PSD based sensors.

The "natural interface keyboard" here described can have cameras or other sensors located at the rear looking obliquely outward toward the front as well as inward so as to have their working volume overlap in the middle of the keyboard such as the nearly full volume over the keyboard area is accommodated.

Clearly larger keyboards can have a larger working volume than one might have on a laptop. The pair of sensors used can be augmented with other sensors mounted on the screen housing. It is noted that the linked dimension afforded for calibration between the sensors located on the screen and those on the keyboard is provided by the laptop unitary construction.

One can use angle sensing means such as a rotary encoder for the laptop screen tilt. Alternatively, cameras located on the screen can be used to image reference points on the keyboard as reference points to achieve this. This allows the calibration of the sensors mounted fixedly with respect to the screen with respect to the sensors and keyboard space below. It also allows one to use stereo pairs of sensors that are not in the horizontal direction (such as 101/102) but could for example be a camera sensor such as 100 on the keyboard coupled with one on the screen, such as 106.

Knowing the pointing angles of the two cameras with respect to one another allows one to solve for the 3D location of objects from the matching of the object image positions in the respective camera fields.

As noted previously, it is also of interest to locate a line or cylinder type target on the finger between the first and second joints. This allows one to use the fingertip for the keyboard activity but by raising the finger up, it can be used as a line target capable of solving for the pointed direction for example.

Alternatively one can use two point targets on the finger such as either retroreflective datums, colored datums such as rings or LED light sources that can also be used with PSD detectors which has also been noted in FIG. 2.

When using the cameras located for the purpose of stereo determination of the position of the fingers from their flesh tone images it is useful to follow the preprocessing capable of processing data obtained from the cameras in order to look for the finger. This can be done on both color basis and on the basis of shape as well as motion.

In this invention, I have shown the use of not only cameras located on a screen looking downward or outward from the screen, but also cameras that can be used instead of or in combination with those on the screen placed essentially on the member on which the keyboard is incorporated. This allows essentially the keyboard to mounted cameras which are preferably mounted flush with the keyboard surface to be unobtrusive, and yet visually be able to see the users fingers, hands or objects held by the user and in some cases, the face of the user.

This arrangement is also useful for 3D displays, for example where special synchronized glasses (e.g., the "Crystal Eyes" brand often used with Silicon Graphics work stations) are used to alternatively present right and left images to each eye. In this case the object may appear to be actually in the workspace 170 above the keyboard, and it may be manipulated by virtually grasping (pushing, pulling, etc.) it, as has been described in co-pending applications.

Figure 4:
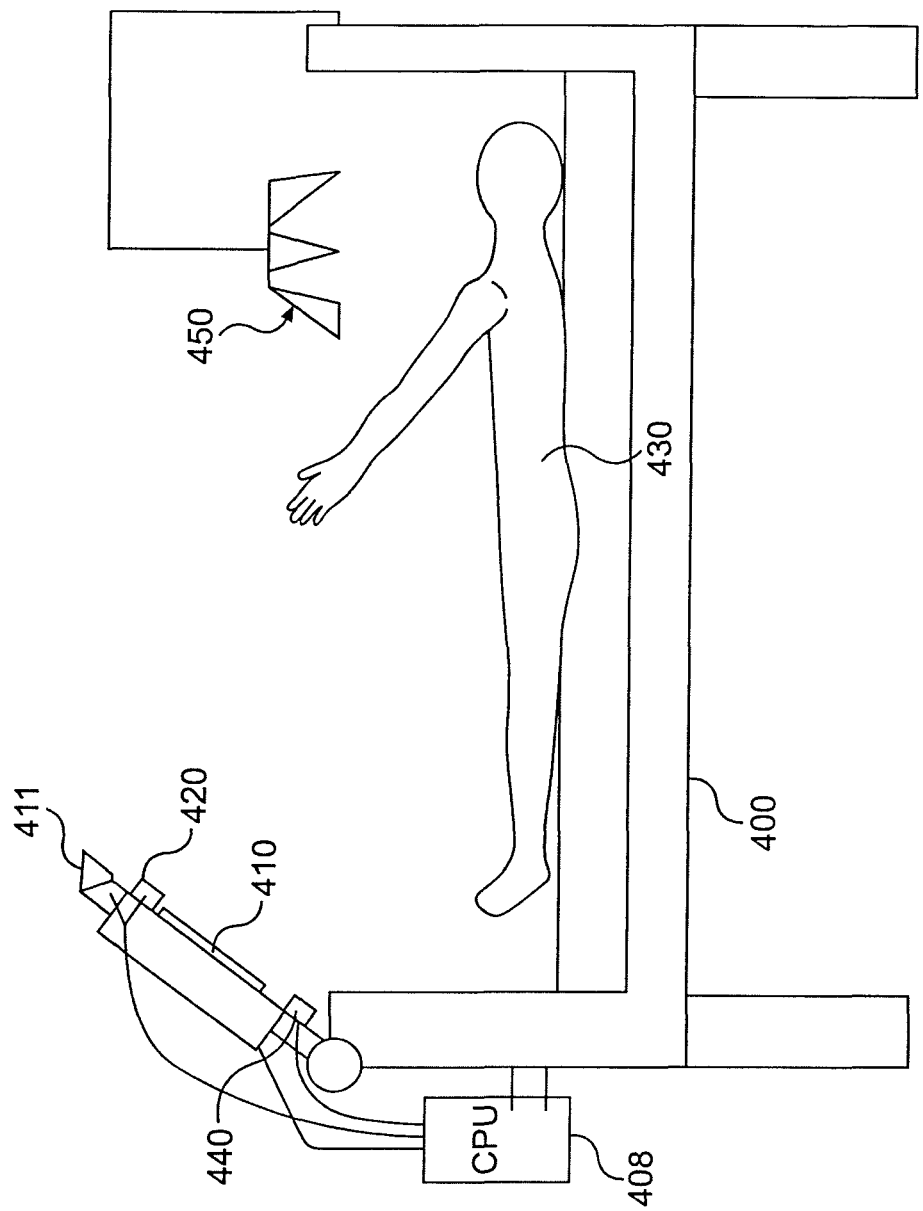

FIG. 4: Baby Learning and Monitoring System

A baby's reaction to the mother (or father) and the mother's analysis of the baby's reaction is very important. There are many gestures of babies apparently indicated in child psychology as being quite indicative of various needs, wants, or feelings and emotions, etc. These gestures are typically made with the baby's hands.

Today this is done and learned entirely by the mother being with the baby. However with an Electro-optical sensor based computer system, such as that described in co-pending applications located proximate to or even in the crib (for example), one can have the child's reactions recorded, not just in the sense of a video tape which would be too long and involved for most to use, but also in terms of the actual motions which could be computer recorded and analyzed also with the help of the mother as to what the baby's responses were. And such motions, combined with other audio and visual data can be very important to the baby's health, safety, and learning.

Consider for example crib 400 with computer 408 having LCD monitor 410 and speaker 411 and camera system (single or stereo) 420 as shown, able to amuse or inform baby 430, while at the same time recording (both visually, aurally, and in movement detected position data concerning parts of his body or objects such as rattles in his hand) his responses for any or all of the purposes of diagnosis of his state of being, remote transmission of his state, cues to various programs or images to display to him or broadcast to others, or the like.

For one example, baby's motions could be used to signal a response from the TV either in the absence of the mother or with the mother watching on a remote channel. This can even be over the Internet if the mother is at work.

For example, a comforting message could come up on the TV from the mother that could be prerecorded (or alternatively could actually be live with TV cameras in the mother's or father's workplace for example on a computer used by the parent) to tell the baby something reassuring or comfort the baby or whatever. Indeed the parent can be monitored using the invention and indicate something back or even control a teleoperator robotic device to give a small child something to eat or drink for example. The same applies to a disabled person.

If the father or mother came up on the screen, the baby could wave at it, move its head or "talk" to it but the hand gestures may be the most important.

If the mother knows what the baby is after, she can talk to baby or say something, or show something that the baby recognizes such as a doll. After a while, looking at this live one can then move to talking to the baby from some prerecorded data.

What other things might we suppose? The baby for example knows to puts its hand on the mother's cheek to cause the mother to turn to it. The baby also learns some other reflexes when it is very young that it forgets when it gets older. Many of these reflexes are hand movements, and are important in communicating with the remote TV based mother representation, whether real via telepresense or from CD Rom or DVD disk (or other media, including information transmitted to the computer from afar) and for the learning of the baby's actions.

Certainly just from the making the baby feel good point-of-view, it would seem like certain motherly (or fatherly, etc.) responses to certain baby actions in the form of words and images would be useful. This stops short of physical holding of the baby which is often needed, but could act as a stop gap to allow the parents to get another hour's sleep for example.

As far as the baby touching things, I've discussed in other applications methods for realistic touch combined with images. This leads to a new form of touching crib mobiles that could contain video imaged and or be imaged themselves—plus if desired—touched in ways that would be far beyond any response that you could get from a normal mobile.

For example, let us say there is a targeted (or otherwise TV observable) mobile 450 in the crib above the baby. Baby reaches up and touches a piece of the mobile which is sensed by the TV camera system (either from the baby's hand position, the mobile movement, or both, and a certain sound is called up by the computer, a musical note for example. Another piece of the mobile and another musical note. The mobile becomes a musical instrument for the baby that could play either notes or chords or complete passages, or any other desired programmed function.

The baby can also signal things. The baby can signal using agitated movements would often mean that it's unhappy. This could be interpreted using learned movement signatures and artificial intelligence as needed by the computer to call for mother even if the baby wasn't crying. If the baby cries, that can be picked up by microphone 440, recognized using a voice recognition system along the lines of that used in IBM Via Voice commercial product for example. And even the degree of crying can be analyzed to determine appropriate action.

The computer could also be used to transmit information of this sort via the internet email to the mother who could even be at work. And until help arrives in the form of mother intervention or whatever, the computer could access a program that could display on a screen for the baby things that the baby likes and could try to soothe the baby through either images of familiar things, music or whatever. This could be useful at night when parents need sleep, and anything that would make the baby feel more comfortable would help the parents.

It could also be used to allow the baby to input to the device. For example, if the baby was hungry, a picture of the bottle could be brought up on the screen. The baby then could yell for the bottle. Or if the baby needed his diaper changed, perhaps something reminiscent of that. If the baby reacts to such suggestions of his problem, this gives a lot more intelligence as to why he is crying and while mothers can generally tell right away, not everyone else can. In other words, this is pretty neat for babysitters and other members of the household so they can act more intelligently on the signals the baby is providing.

Besides in the crib, the system as described can be used in conjunction with a playpen, hi-chair or other place of baby activity.

As the child gets older, the invention can further be used also with more advanced activity with toys, and to take data from toy positions as well. For example, blocks, dolls, little cars, and moving toys even such as trikes, scooters, drivable toy cars and bikes with training wheels.

The following figure illustrates the ability of the invention to learn, and thus to assist in the creation of toys and other things.

Figure 5:
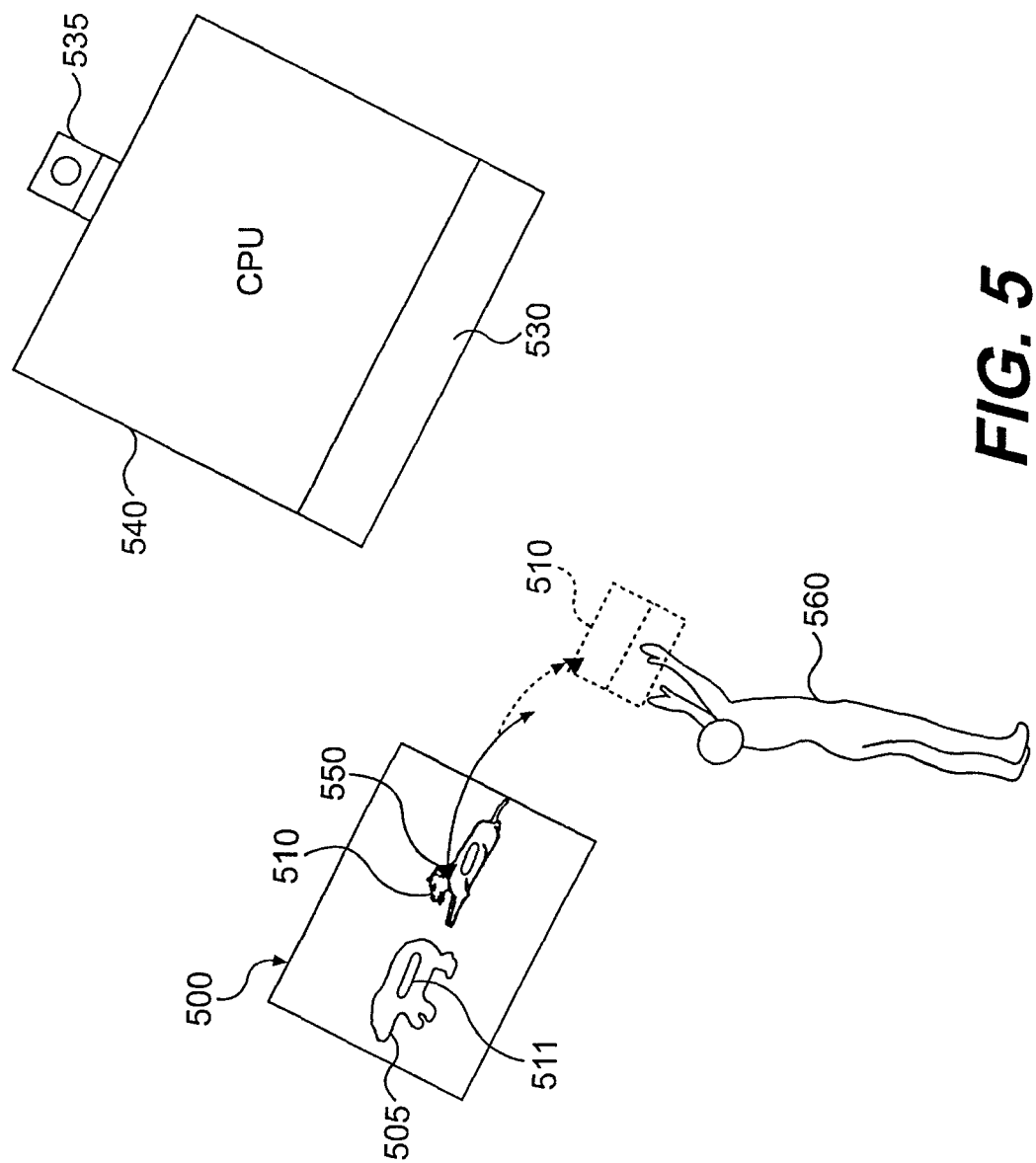
FIG. 5 illustrates a puzzle toy for young children having cut out wood characters according to the invention.

FIG. 5: Learning Puzzle Roy

Disclosed in FIG. 5 is a puzzle toy 500 where woodcut animals such as bear 505 and lion 510 are pulled out with handle such as 511. The child can show the animal to the camera and a computer 530 with TV camera (or cameras) 535 can recognize the shape as the animal, and provide a suitable image and sounds on screen 540.

Alternatively, and more simply, a target, or targets on the back of the animal can be used such as triangle 550 on the back of lion 511. In either case the camera can solve for the 3D, and even 5 or 6D position and orientation of the animal object, and cause it to move accordingly on the screen as the child maneuvers it. The child can hold two animals, one in each hand and they can each be detected, even with a single camera, and be programmed in software to interact as the child wishes (or as he learns the program).

This is clearly for very young children of two or three years of age. The toys have to be large so they can't be swallowed.

With the invention in this manner, one can make a toy of virtually anything, for example a block. Just hold this block up, teach the computer/camera system the object and play using any program you might want to represent it and its actions. To make this block known to the system, the shape of the block, the color of the block or some code on the block can be determined. Any of those items could tell the camera which block it was, and most could give position and orientation if known.

At that point, an image is called up from the computer representing that particular animal or whatever else the block is supposed to represent. Of course this can be changed in the computer to be a variety of things if this is something that is acceptable to the child. It could certainly be changed in size such as a small lion could grow into a large lion. The child could probably absorb that more than a lion changing into a giraffe for example since the block wouldn't correspond to that. The child can program or teach the system any of his blocks to be the animal he wants and that might be fun.

For example, he or the child's parent could program a square to be a giraffe where as a triangle would be a lion. Maybe this could be an interesting way to get the child to learn his geometric shapes!

Now the basic block held up in front of the camera system could be looked at just for what it is. As the child may move the thing toward or away from the camera system, one may get a rough sense of depth from the change in shape of the object. However this is not so easy as the object changes in shape due to any sort of rotations.

Particularly interesting then is to also sense the rotations if the object so that the animal can actually move realistically in 3 Dimensions on the screen. And perhaps having the de-tuning of the shape of the movement so that the child's relatively jerky movements would not appear jerky on the screen or would not look so accentuated. Conversely of course, you can go the other way and accentuate the motions.

This can, for example, be done with a line target around the edge of the object is often useful for providing position or orientation information to the TV camera based analysis software, and in making the object easier to see in reflective illumination.

Aid to Speech Recognition

The previous co-pending application entitled "Useful man machine interfaces and applications" referenced above, discussed the use of persons movements or positions to aid in recognizing the voice spoken by the person.

In one instance, this can be achieved by simply using ones hand to indicate to the camera system of the computer that the voice recognition should start (or stop, or any other function, such as a paragraph or sentence end, etc.).

Another example is to use the camera system of the invention to determine the location of the persons head (or other part), from which one can instruct a computer to preferentially evaluate the sound field in phase and amplitude of two or more spaced microphones to listen from that location—thus aiding the pickup of speech—which often times is not able to be heard well enough for computer based automatic speech recognition to occur.

Digital Interactive TV

As you watch TV, data can be taken from the camera system of the invention and transmitted back to the source of programming. This could include voting on a given proposition by raising your hand for example, with your hand indication transmitted. Or you could hold up 3 fingers, and the count of fingers transmitted. Or in a more extreme case, your position, or the position of an object or portion thereof could be transmitted—for example you could buy a coded object—whose code would be transmitted to indicate that you personally (having been pre-registered) had transmitted a certain packet of data.

If the programming source can transmit individually to you (not possible today, but forecast for the future), then much more is possible. The actual image and voice can respond using the invention to positions and orientations of persons or objects in the room—just as in the case of prerecorded data—or one to one internet connections. This allows group activity as well.

In the extreme case, full video is transmitted in both directions and total interaction of users and programming sources and each other becomes possible.

An interim possibility using the invention is to have a program broadcast to many, which shifts to prerecorded DVD disc or the like driving a local image, say when your hand input causes a signal to be activated.

Handwriting Authentication

A referenced co-pending application illustrated the use of the invention to track the position of a pencil in three dimensional space such that the point at which the user intends the writing point to be at, can be identified and therefore used to input information, such as the intended script.

As herein disclosed, this part of the invention can also be used for the purpose of determining whether or not a given person's handwriting or signature is correct.

For example, consider authentication of an Internet commercial transaction. In this case, the user simply writes his name or address and the invention is used to look at the movements of his writing instrument and determine from that whether or not the signature is authentic. (A movement of one or more of his body parts might also or alternatively be employed). For example a series of frames of datum location on his pen can be taken, to determine one or more positions on it as a function of time, even to include calculating of its pointing direction, from a determined knowledge in three axes of two points along the line of the pen axis. In this case a particular pointing vector sequence "signature" would be learned for this person, and compared to later signatures.

What is anticipated here is that in order to add what you might call the confirming degree of authenticity to the signature, it may not be necessary to track the signature completely. Rather one might only determine that certain aspects of the movement of the pencil are the authentic ones. One could have people write using any kind of movement, not just their signature having their name. The fact is that people are mostly used to writing their name and it would be assumed that that would be it. However, it could well be that the computer asks the user to write something else that they would then write and that particular thing would be stored in the memory.

Optionally, one's voice could be recognized in conjunction with the motion signature to add further confirmation.

This type of ability for the computer system at the other end of the Internet to query a writer to write a specific thing in a random fashion adds a degree of cryptographic capacity to the invention. In other words, if I can store the movements in my hand to write different things, then clearly this has some value.

The important thing though is that some sort of representation of the movements of the pencil or other instrument can be detected using the invention and transmitted.

Figure 6:
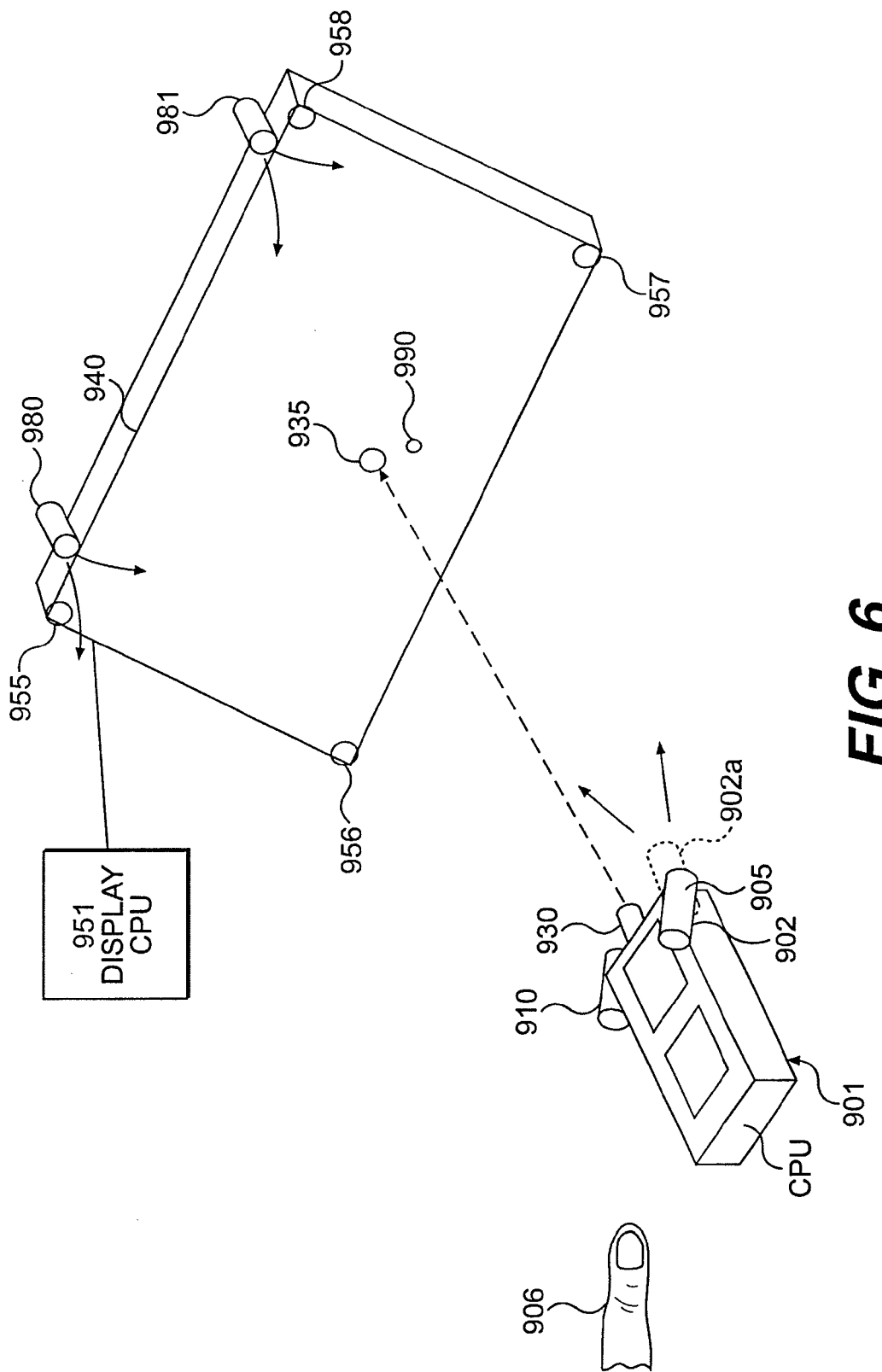
FIG. 6 illustrates an improved handheld computer embodiment of the invention, in which the camera or cameras may be used to look at objects, screens and the like as well as look at the user along the lines of FIG. 1.

FIG. 6: Hand Held Computer

FIG. 6 illustrates an improved handheld computer embodiment of the invention. For example, FIG. 8 of the provisional application referenced above entitled "camera based man machine interfaces and applications" illustrates a basic hand held device and which is a phone, or a computer or a combination thereof, or alternatively to being hand held, can be a wearable computer for example on one's wrist.

In this embodiment, we further disclose the use of this device as a computer, with a major improvement being the incorporation of a camera of the device optionally in a position to look at the user, or an object held by the user-along the lines of FIG. 1 of the instant disclosure for example.

Consider hand held computer 901 of FIG. 6, incorporating a camera 902 which can optionally be rotated about axis 905 so as to look at the user or a portion thereof such as finger 906, or at objects at which it is pointed. Optionally, and often desirably, a stereo pair of cameras to further include camera 910 can also be used. It too may rotate, as desired. Alternatively fixed cameras can be used as in FIG. 1, and FIG. 8 of the referenced co-pending application, when physical rotation is not desired, for ruggedness, ease of use, or other reasons (noting that fixed cameras have fixed fields of view, which limit versatility in some cases).

When aimed at the user, as shown, it can be used, for example, to view and obtain images of:

Ones self-facial expression etc., also for image reasons, id etc., combined effect.

Ones fingers (any or all), one finger to other and the like. This in turn allows conversing with the computer in a form of sign language which can replace the keyboard of a conventional computer.

One or more objects in one's hand. Includes a pencil or pen, and thus can be used rather than having a special touch screen and pencil if the pencil itself is tracked as disclosed in the above figure. It also allows small children to use the device, and those who cannot hold an ordinary stylus.

One's gestures.

The camera 902 (and 910 if used, and if desired), can also be optionally rotated and used to viewpoints in space ahead of the device, as shown in dotted lines 902*a*. In this position for example it can be used for the purposes described in the previous application. It can also be used to observe or point at (using optional laser pointer 930) points such as 935 on a wall, or a mounted LCD or projection display such as 940 on a wall or elsewhere such as on the back of an airline seat.

With this feature of the invention, there is no requirement to carry a computer display with you as with an infrared connection (not shown) such as known in the art one can also transmit all normal control information to the display control computer 951. As displays become ubiquitous, this makes increasing sense—otherwise the displays get bigger the computers smaller trend doesn't make sense if they need to be dragged around together. As one walks into a room, one uses the display or displays in that room (which might themselves be interconnected).

The camera unit 902 can sense the location of the display in space relative to the handheld computer, using for example the four points 955-958 on the corners of the display as references. This allows the handheld device to become an accurate pointer for objects displayed on the screen, including control icons. And it allows the objects on the screen to be sensed directly by the camera—if one does not have the capability to spatially synchronize and coordinate the display driver with the handheld computer.

The camera can also be used to see gestures of others, as well as the user, and to acquire raw video images of objects in its field.

A reverse situation also exists where the cameras can be on the wall mounted display, such as cameras 980 and 981 can be used to look at the handheld computer module 901 and determine its position and orientation relative to the display.

Note that a camera such as 902, looking at you the user, if attached to hand held unit, always has reference frame of that unit. If one works with a screen on a wall, one can aim the handheld unit with camera at it, and determine its reference frame to the handheld unit. Also can have two cameras operating together, one looking at wall thing, other at you (as 902 and 902*a*) in this manner, one can dynamically compare ref frames of the display to the human input means in determining display parameters. This can be done in real time, and if so one can actually wave the handheld unit around while still imputing accurate data to the display using ones fingers, objects or whatever.

Use of a laser pointer such as 930 incorporated into the handheld unit has also been disclosed in the referenced co-pending applications. For example, a camera on the hand held computer unit such as 902 viewing in direction 902*a* would look at laser spot such as 990 (which might or might not have come from the computers own laser pointer 930) on the wall display say, and recognized by color and size/shape reference to edge of screen, and to projected spots on screen.

Figure 7A:
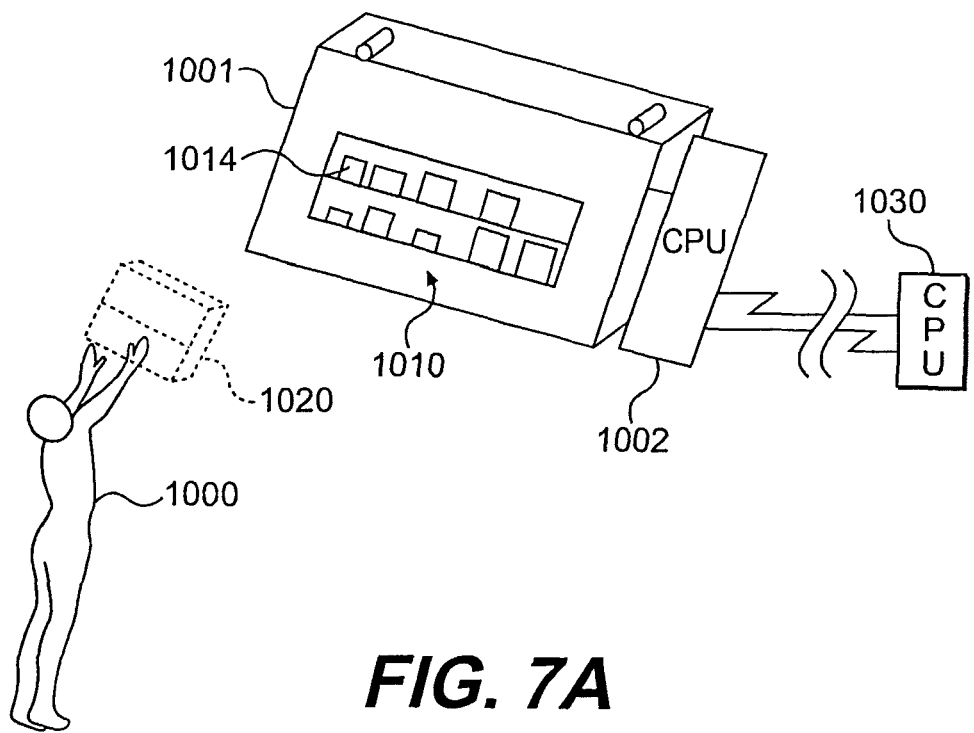
FIGS. 7A-B illustrate new methods for internet commerce and other activities involving remote operation with 3D virtual objects display.
Figure 7B:
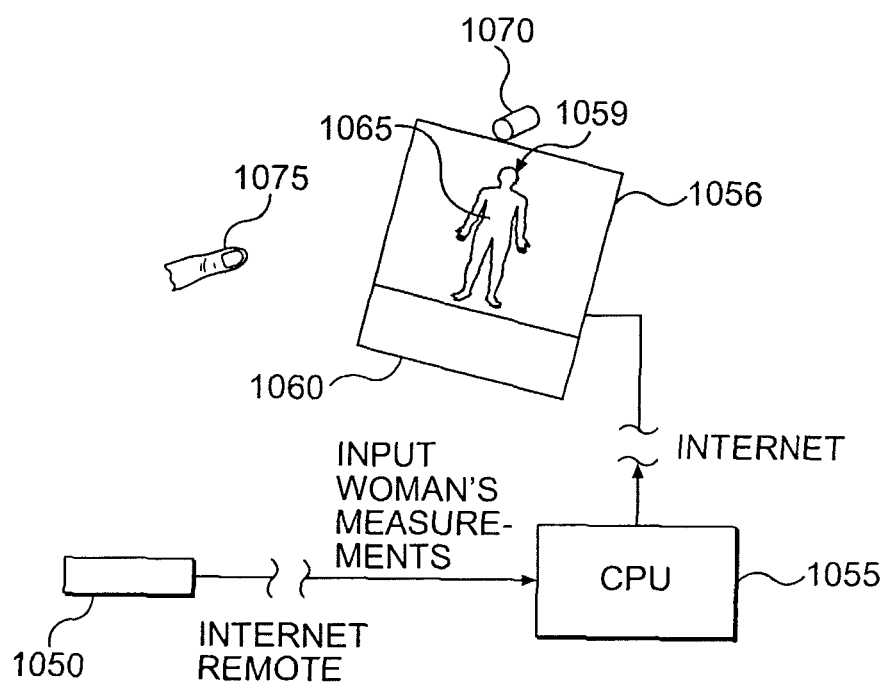

FIGS. 7A-B: Internet and Other Remote Applications

FIG. 7A illustrates new methods for internet commerce and other activities involving remote operation with 3D virtual objects displayed on a screen. This application also illustrates the ability of the invention to prevent computer vision eye strain.

Let us first consider the operation of the invention over the internet as it exists today in highly bandwidth limited form dependent on ordinary phone lines for the most part. In this case it is highly desirable to transmit just the locations or pointing vectors of portions (typically determined by stereo photo-grammetry of the invention) of human users or objects associated therewith to a remote location, to allow the remote computer 10 to modify the image or sound transmitted back to the user.

Another issue is the internet time delay, which can exist in varying degrees, and is more noticeable, the higher resolution of the imagery transmitted. In this case, a preferred arrangement is to have real time transmission of minimal position and vector data (using no more bandwidth than voice), and to transmit back to the user, quasi stationary images at good resolution. Transmission of low resolution near real time images common in internet telephony today, does not convey the natural feeling desired for many commercial applications to now be discussed. As bandwidth becomes more plentiful these restrictions are eased.

Let us consider the problem posed of getting information from the internet of today. A user 1000 can go to a virtual library displayed on screen 1001 controlled by computer 1002 where one sees a group 1010 of books on stacks. Using the invention as described herein and incorporated referenced applications to determine my hand and finger locations, I the user, can point at a book such as 1014 in a computer sensed manner, or even reach out and "grab" a book, such as 1020 (dotted lines) apparently generated in 3D in front of me.

My pointing, or my reach and grab is in real time, and the vector (such as the pointing direction of ones finger at the book on the screen, or the position and orientation closing vectors of one's forefinger and thumb to grab the 3D image 1020 of the book) indicating the book in question created is transmitted back by internet means to the remote computer 1030 which determines that I have grabbed the book entitled War and Peace from the virtual shelf. A picture of the book coming off the shelf is then generated using fast 3D graphical imagery such as the Merlin VR package available today from Digital Immersion company of Sudbury, Ontario. This picture (and the original picture of the books on the shelves) can be retransmitted over the internet at low resolution (but sufficient speed) to give a feeling of immediacy to the user. Or alternatively, the imagery can be generated locally at higher resolution using the software package resident in the local computer 1002 which receives key commands from the distant computer 1030.

After the book has been "received" by the user, it then can be opened automatically to the cover page for example under control of the computer, or the users 10 hands can pretend to open it, and the sensed hands instruct the remote (or local, depending on version) computer to do so. A surrogate book such as 1040 can also be used to give the user a tactile feel of a book, even though the real book in questions pages will be viewed on the display screen 1001. One difference to this could be if the screen 1001 depicting the books were life size, like real stacks. Then one might wish to go over to a surrogate book incorporating a separate display screen—just as one would in a real library, go to a reading table after removing a book from a stack.

Net Grocery stores have already appeared, and similar applications concern picking groceries off of the shelf of a virtual supermarket, and filling ones shopping cart. For that matter, any store where it is desired to show the merchandise in the very manner people are accustomed to seeing it, namely on shelves or racks, generally as one walks down an aisle, or fumbles through a rack of clothes for example. In each case, the invention, which also can optionally use voice input, as if to talk to a clothing sales person, can be used to monitor the person's positions and gestures.

The invention in this mode can also be used to allow one to peruse much larger objects. For example, to buy a car (or walk through a house, say) over the internet, one can lift the hood, look inside, etc., all by using the invention to monitor the 3D position of your head or hands and move the image of the car presented accordingly. If the image is presented substantially life-size, then one can be monitored as one physically walks around the car in one's room say, with the image changing accordingly. In other words just as today.

Note that while the image can be apparently life-size using virtual reality glasses, the natural movements one is accustomed to in buying a car are not present. This invention makes such a natural situation possible (though it can also be used with such glasses as well).

It is noted that the invention also comprehends adding a force based function to a feedback to your hands, such that it feels like you lifted the hood, or grabbed the book, say. For this purpose holding a surrogate object as described in co-pending applications could be useful, in this case providing force feedback to the object.

If one looks at internet commerce today, some big applications have turned out 10 to be clothes and books. Clothes are by far the largest expenditure item, and let's look closer at this.

Consider too a virtual mannequin, which can also have measurements of a remote shopper. For example, consider diagram 78, where a woman's measurements are inputted by known means such as a keyboard 1050 over the internet to a CAD program in computer 1055, which creates on display screen 1056 a 3D representation of a mannequin 1059 having the woman's shape in the home computer 1060. As she selects a dress 1065 to try on, the dress which let's say comes in 10 sizes, 5 to 15, is virtually "tried on" the virtual mannequin and the woman 1070 looks at the screen 1056 and determines the fit of a standard size 12 dress. She can rapidly select larger or smaller sizes and decide which she thinks looks and/or fits better.

Optionally, she can signal to the computer to rotate the image in any direction, and can look at it from different angles up or down as well, simply doing a rotation in the computer. This signaling can be conventional using for example a mouse, or can be using TV based sensing aspects of the invention such as employing camera 1070 also as shown in FIG. 1 for example. In another such case, she can reach out with her finger 1075 for example, and push or pull in a virtual manner the material, using the camera to sense the direction of her finger. Or she can touch herself at the points where the material should be taken up or let out, with the camera system sensing the locations of touch (typically requiring at least a stereo pair of cameras or other electro-optical system capable of determining where her fingertip is in 3D space. Note that a surrogate for the tried on dress in this case, could be the dress she has on, which is touched in the location desired on the displayed dress.

The standard size dress can then be altered and shipped to her, or the requisite modifications can be made in the CAD program, and a special dress cut out and sewed which would fit better.

A person can also use her hands via the TV cameras of the invention to determine hand location relative to the display to take clothes off a virtual manikin which could have a representation of any person real or imaginary. Alternatively she can remotely reach out using the invention to a virtual rack of clothes such as 1090, take an object off the rack, and put it on the manikin. This is particularly natural in near life-size representation, just like being in a store or other venue. This ability of the invention to bring real life experience to computer shopping and other activity that is a major advantage.

The user can also feel the texture of the cloth if suitable haptic devices are 15 available to the user, which can be activated remotely by the virtual clothing program, or other type of program.

Modifications of the invention herein disclosed will occur to persons skilled in the art, and all such modifications are deemed to be within the scope of the invention as defined by the appended claims.

The invention claimed is:

1. A computer apparatus comprising:
a laptop housing including an upper portion and a lower portion, the upper portion including a display and the lower portion including a keyboard, the upper portion being movable relative to the lower portion to an open position;
first and second digital cameras supported by the lower portion housing oriented upwardly with and having overlapping fields of view in the region above the keyboard when the upper portion is in the open position, the digital cameras providing respective first and second outputs; and
a processing unit operatively coupled to the first and second outputs, wherein the processing unit is adapted to determine a gesture performed in the overlapping fields of view and is further adapted to correlate the gesture with a computer input function.

2. The computer apparatus of claim 1 wherein the first and second digital cameras are positioned laterally outward of the keyboard.

3. The computer apparatus of claim 1 wherein the processing unit is adapted to compare successive outputs of the first and second cameras to determine the gesture.

4. The computer apparatus of claim 1 wherein the determined gesture includes a pinch gesture.

5. The computer apparatus of claim 1 wherein the determined gesture includes a pointing gesture.

6. The computer apparatus of claim 1 wherein the determined gesture includes a grip gesture.

7. The computer apparatus of claim 1 wherein the upper portion is hinged relative to the lower portion.

8. A computer implemented method comprising:
providing a keyboard, a plurality of keys supported by the keyboard, and first and second digital cameras in fixed relation relative to the plurality of keys, the first and second digital cameras oriented upwardly with overlapping fields of view in the region above the plurality of keys;
detecting a gesture performed in the overlapping fields of view by comparing successive outputs of the first and second digital cameras, the gesture being performed by at least one of a user's hand and a user's finger; and correlating the detected gesture with a computer input function, wherein the computer input function is one of a plurality of computer input functions stored in computer readable memory.

9. The method according to claim 8 wherein the detected gesture includes a pinch gesture.

10. The method according to claim 8 wherein the detected gesture includes a pointing gesture.

11. The method according to claim 8 wherein the detected gesture includes a grip gesture.

12. The method according to claim 8 wherein the first and second digital cameras are positioned laterally outward of the plurality of keys.

13. The method according to claim 8 wherein the first and second digital cameras and the plurality of keys are supported by a housing.

14. The method according to claim 13 wherein the housing defines first and second apertures for the first and second digital cameras.

15. A keyboard apparatus for a computer, the keyboard apparatus comprising:
a housing defining an upper surface;
a plurality of keys extending through the housing upper surface; and
first and second digital cameras supported at the housing upper surface and oriented upwardly therefrom with overlapping fields of view in the region above the plurality of keys, the digital cameras providing respective first and second outputs, wherein the first and second outputs are adapted to be coupled to a processing unit operable to determine a gesture performed in the overlapping fields of view.

16. The keyboard apparatus of claim 15 wherein the housing defines first and second apertures for the first and second digital cameras.

17. The keyboard apparatus of claim 16 wherein the housing includes first and second transparent covers overlying the first and second apertures.

18. The keyboard apparatus of claim 15 wherein the detected gesture includes a pinch gesture.

19. The keyboard apparatus of claim 15 wherein the detected gesture includes a pointing gesture.

20. The keyboard apparatus of claim 15 wherein the detected gesture includes a grip gesture.

21. A computer implemented method comprising:
providing first and second cameras in fixed relation relative to each other and including overlapping fields of view, wherein the first and second cameras are coupled to a keyboard and oriented upwardly relative to said keyboard; and
detecting, using the first and second cameras, a gesture performed in the overlapping fields of view, the gesture being performed by at least one of a user's hand and a user's finger, wherein the first and second cameras are oriented upwardly to observe a gesture performed in a work volume above the first and second cameras.

22. The method according to claim 21 further including providing a light source in fixed relation to the first and second cameras and oriented toward the work volume.

23. The method according to claim 22 wherein the light source includes a light emitting diode.

24. The method according to claim 22 wherein the light source includes a plurality of light emitting diodes.

25. The method according to claim 21 wherein the detected gesture includes at least one of a pinch gesture, a point gesture, a grasp gesture, and a grip gesture.

26. The method according to claim 21 further including determining the pointing direction of one of the user's finger using the first and second cameras.

27. The method according to claim 21 further including providing a target positioned on the user that is viewable by the first and second cameras.

28. The method according to claim 21 further including determining the three-dimensional position of a point on the at least one of the user's hand and the user's finger using the first and second cameras.

29. The method according to claim 21 further including providing a three-dimensional display viewable by the user.

30. The method according to claim 21 wherein:
the first and second cameras are positioned in fixed relation relative to a keyboard; and
the first and second cameras and the keyboard form part of a laptop computer.

* * * * *